Patented Dec. 11, 1934

1,983,561

UNITED STATES PATENT OFFICE 1,983,561

SELENO-ANTHRAQUINONE COMPOUND AND PROCESS OF PREPARING THE SAME

Melvin A. Perkins, Milwaukee, Wis., and Oakley Maurice Bishop, deceased, late of Wilmington, Del., by Eva P. Bishop and Wilmington Trust Company, executors, Wilmington, Del., assignors to E. I. du Pont de Nemours & Company, Wilmington, Del., a corporation of Delaware No Drawing. Application August 1, 1932, Serial No. 627,222

17 Claims. (Cl. 260—59)

This invention relates to novel intermediates for dyestuffs and a process of preparing the same. More particularly, this invention deals with novel seleno-anthraquinone compounds, which are characterized by containing in their structure at least one anthraquinone grouping having a selenium atom in an alpha position and an amino group in position ortho thereto. In general, our novel intermediates may be designated as 1-seleno-2-amino-anthraquinone compounds, which contain in their structure the following atomic grouping:

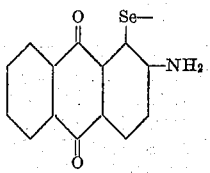

This group includes 2-amino-anthraquinone-1-selenol (or seleno-phenol), the metallic salts of 2-amino-anthraquinone-1-selenol which shall be designated hereinafter as 1-metal-selenolates of 2-amino-anthraquinone, 2,2'-diamino-1,1'-dianthraquinonyl-diselenide, nuclear substitution derivatives of the above compounds as typified by 3-halogen-2-amino-anthraquinone-1-selenol, salts of the amino group of the above compounds such as the sulfate of 2,2'-diamino-1,1'-dianthraquinonyl-diselenide and analogous compounds.

All the above mentioned compounds form a natural group due to their common adaptability for forming anthraquinone-1,2-selenazole compounds upon condensation with organic acyl halides or aldehydes as more fully described in copending application Serial No. 627,223. These selenazole derivatives are valuable vat dyestuffs dyeing cotton in greenish-yellow to orange shades as more fully described in said copending application.

It is accordingly an object of this invention to produce novel intermediates for vat dyestuffs dyeing cotton in greenish yellow to orange shades.

It is a further object of this invention to produce novel selenium derivatives of anthraquinone characterized by the presence of a selenium atom in an alpha position and an amino group in a position ortho thereto.

It is a further object of this invention to provide an improved process for preparing said novel anthraquinone derivatives which is adapted for economical production on a large scale.

Other and further important objects of this invention will appear as the description proceeds.

Generally speaking, our preferred process of synthesizing the above novel compounds consists of or comprises the step of reacting a 1-halogen-2-amino-anthraquinone body with an alkali-metal selenide. The primary product of the reaction is thus a 1-alkali-metal-selenolate-2-amino-anthraquinone body. If the free selenol is desired, the said primary reaction product is treated with an acid. Mild oxidation of the alkali-metal salt produces the corresponding diselenide.

As initial material any 1-halogen-2-amino-anthraquinone compound may be used. The 1-chloro- or 1-bromo- derivatives are, naturally, the most common and most economical to use. If nuclearly substituted 1-seleno-2-amino-anthraquinone bodies are desired, the corresponding nuclearly substituted 1-halogen-2-amino-anthraquinone bodies are to be used. Thus the selection of 1,3-dichloro- or 1,3-dibromo-2-amino-anthraquinone as initial material results in 1-seleno-2-amino-3-chloro- or bromo-anthraquinone respectively. It is remarkable that the halogen atom in the beta position is not exchanged by selenium.

The reaction is best carried out in alcoholic suspension, but other organic solvents or suspending media may be employed. The reaction will also proceed in aqueous suspension, but the rate of reaction in this case is slow. Also, in the presence of air and water, the seleno-anthraquinone body tends to oxidize to the corresponding diselenide. It is therefore desirable to avoid excessive quantites of water in the suspending medium.

The alkali-metal selenide required for the reaction may be prepared separately, for instance, by passing in hydrogen selenide into an aqueous solution of an alkali-metal hydroxide. We find it, however, considerably more advantageous to generate the hydrogen selenide or the alkali-metal selenide directly in the reaction mass by reducing selenium by a suitable reducing agent. Thus we may suspend elemental selenium in alcohol, add metallic sodium and the desired 1-halogen-2-amino anthraquinone body and proceed simultaneously with the 2 reactions. These apparently proceed along the following lines:

(1) $2Na + Se \rightarrow Na_2Se$

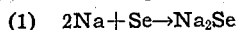
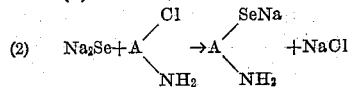

(A = an anthraquinone residue)

Instead of metallic sodium, other reducing agents which are adapted to act in alkaline solution may be used, for instance, aluminum or zinc and caustic soda, or an alkaline hydrosulfite solution. Instead of elemental selenium, an oxide thereof, say selenium dioxide, may be used.

The products of this reaction are generally violet to greenish blue solids relatively stable in the absence of air. When exposed to air, they oxidize into the corresponding diselenides. They are sparingly soluble in hot or cold water, giving blue-violet solutions. They are practically insoluble in the common organic solvents, but their suspensions in such media are readily acted upon by acyl-chlorides producing the corresponding anthraquinone-1,2-selenazoles, which may be recognized by their capacity of dyeing cotton by the vat process in greenish-yellow to orange shades.

As stated above, the primary products of our process may be converted into the corresponding diselenides by mild oxidizing agents. These new bodies are considerably more stable in open air than the corresponding alkali-metal selenolates and may therefore be isolated in a higher state of purity. For said reason, the said conversion of the products into diselenides is highly desirable.

This oxidation may be effected by aerating the re-action mass or by treating it with mild oxidizing agents, such as potassium ferricyanide, sodium perborate, sodium-m-nitro-benzene-sulfonate; and the like. The diselenides thus obtained are generally orange to brown solids melting above 300° C. They are sparingly soluble in organic solvents, and may be crystallized from a large quantity of nitrobenzene in the form of slender needles.

Without limiting our invention to any particular procedure, the following examples are given for the purpose of illustration. Parts mentioned are by weight.

*Example 1*

10 parts of 1-chloro-2-amino-anthraquinone are added to a suspension of 5.5 parts of sodium selenide in an aqueous alcoholic mixture containing 50 parts of alcohol and 30 parts of water. The entire mixture is heated to reflux temperature (80° C.) under good agitation and refluxed until there is no further change. The mixture first becomes dark in color and thickens rapidly. The product of the reaction appears under the microscope as bright blue plates or needles (depending upon the rate of formation) and is easily differentiated from the orange yellow starting material.

When there are no more particles of yellow solid remaining, the mixture is allowed to cool. It is then filtered, washed with 15% salt solution until the filtrate is colorless and then with 93% alcohol to displace the salt water. The blue product, which is 2-amino-anthraquinone-1-sodium-selenolate, is dried rapidly to prevent undue oxidation and preserved in tight containers. It is slowly decomposed on exposure to air but keeps well in closed containers. It is sparingly soluble in hot or cold water, giving a blue-violet solution. It is practically insoluble in the common organic solvents, but its suspensions are readily acted upon by acid chlorides.

The free selenol (or selenophenol) may be obtained by acidification of the sodium salt, preferably in the presence of a bisulphite. It forms an orange-brown solid and is sparingly soluble in most organic solvents, with the exception of nitrobenzene in which it dissolves readily. It dissolves slowly in concentrated sulfuric acid giving an orange-yellow color which becomes greenish on heating. Heated with dilute caustic solution it dissolves sparingly with a blue-violet color.

The 2-amino-anthraquinone-1-sodium-selenolate above described may be converted into 2,2'-diamino-1,1'-dianthraquinonyl-diselenide by reacting upon an aqueous slurry or solution of the former with mild oxidizing agents, such as air or potassium ferricyanide. The diselenide thus obtained is a reddish orange solid melting above 300° C. When viewed under the microscope, it appears to consist of tiny, curved, orange needles. It is very sparingly soluble in organic solvents and crystallizes from hot nitrobenzene in long, very slender orange needles. It dissolves readily in concentrated sulfuric acid, giving a yellow color. It is unaffected by boiling dilute alkali, but the addition of sodium sulfide to this suspension causes immediate reduction, and the blue-violet color of 2-amino-anthraquinone-1-sodium-selenolate solution is formed.

*Example 2*

10 parts of finely divided selenium are suspended in 200 parts of alcohol and 12 parts of sodium are added in small portions and under good agitation. The temperature is not allowed to rise above 50° C. during this operation. When all sodium is dissolved, 30 parts of finely ground 1-chloro-2-amino-anthraquinone are added and the charge is heated to reflux (80° C.). The mass rapidly thickens and becomes blue. Refluxing is continued for two hours or until no yellow particles remain in the charge when a sample is viewed under the microscope. A part or all of the alcohol is now distilled off and the mass is diluted with 15% salt solution, filtered and washed in the usual manner. The yield is practically quantitative. The product is substantially identical with that of Example 1.

*Example 3*

93 parts of sodium hydroxide are dissolved in 283 parts of water; 38 parts of selenium are added and the mixture is agitated. At 50° C., aluminum turnings are added in small portions, allowing the temperature to rise slowly until at the end of addition of a total of 12 parts of aluminum, the mass has reached the boil. The mass is refluxed until no more aluminum remains undissolved (about 15 minutes), then cooled to 75° C., and 100 parts of finely ground 1-chloro-2-amino-anthraquinone and 400 parts of alcohol are added. The mass is now again refluxed (80° C.) under good agitation for about 15 hours or until no unchanged starting material remains. The product is isolated as in Example 1 or 2.

*Example 4*

40 parts of metallic sodium are dissolved slowly in a suspension of 31 parts of selenium powder and 27 parts of sodium formate in 330 parts of 93% alcohol. The melt is then heated to reflux (87° C.) for one hour to insure solution of the last traces of sodium. It is then cooled to 75° C. and 300 parts of water are carefully introduced beneath the surface of the charge. 85 parts of dry powered 1,3-dichloro-2-amino-anthraquinone are now introduced, and the charge is heated once more to reflux (80° C.) and maintained at that temperature until no more yellow crystals remain. The mass becomes thick and the solid changes from a bright yellow to a dull greenish blue.

When the reaction is complete, the charge is cooled to room temperature, filtered, washed with dilute sodium sulfide solution (to rid of excess selenium) then with dilute salt solution or with cold water, and finally with alcohol.

The 2-amino-3-chloro-anthraquinone-1-sodium-selenolate thus obtained is a greenish blue solid, fairly stable when kept in air tight containers. When viewed under the microscope it appears to consist of tiny needles. The compound is less readily soluble in hot or cold water than the chlorine-free product described in Example 1, but dissolves sufficiently to impart to the solution a violet-blue color.

From the above sodium salt, the free selenol and the corresponding diselenide may be obtained in the manner described in Example 1 for the chlorine-free products.

The free selenol is a brownish yellow solid, dissolving in sulfuric acid with an orange yellow color and, like mercaptans and other selenols, is difficult to obtain free from the corresponding diselenide.

The diselenide is a light brownish yellow powder, crystallizing from nitrobenzene in yellow needles. The coloration in concentrated sulfuric acid solution is a greenish yellow.

Example 5

34 parts of 1,3-dichloro-2-amino-anthraquinone and 11.5 parts of selenium are suspended in a solution of 39 parts of potassium hydroxide in 85 parts of water mixed with 105 parts of 93% alcohol. The mixture is well agitated, heated to gentle ebullition and treated over the course of one hour with 3.6 parts of aluminum turnings which are added uniformly in small portions. A thick violet-blue crystalline mass forms. Examined under the microscope the product appears as clean-cut, dark violet-blue needles and plates. When all yellow particles have disappeared, the charge is allowed to cool, filtered, washed with saturated potassium chloride solution and finally with alcohol. The dry potassium selenolate of 2-amino-3-chloro-anthraquinone appears to be fairly stable when dry but in the course of a few weeks is entirely converted to a brownish powder even in well closed containers. In the moist condition, it is extremely susceptible to oxidation. Furthermore, it is considerably more soluble in water than the corresponding sodium salt. Accordingly, if sodium chloride solution is used in washing the above reaction product, in place of potassium chloride, the bright-blue sodium selenolate is the sole product obtained.

Example 6

10 parts of selenium powder are suspended in 135 parts of 93% alcohol. 12 parts of sodium are dissolved in this mixture over the course of one to two hours, keeping the temperature below 65° C. When the sodium has completely dissolved, 45 parts of 1,3-dibromo-2-amino-anthraquinone and 135 parts of alcohol are added. The mixture is well agitated and heated at reflux (80° C.) until no more yellow particles remain. The mass becomes dark greenish blue and is quite thick. The product, which is 2-amino-3-bromo-anthraquinone-1-sodium-selenolate, is a blue-green solid composed of very small needles and closely resembles its chloro analog, than which it is even less soluble in water and less susceptible to oxidation.

Due to its very slight solubility, this sodium salt is converted only slowly and with difficulty to the corresponding selenol and diselenide.

2-amino-3-bromo-anthraquinone-1-selenol and the corresponding diselenide form dark greenish-yellow crystalline powders and are sparingly soluble in organic solvents. The diselenide crystallizes sparingly from nitrobenzene in clumps of very short, yellow needles. Both the selenol and the diselenide dissolve in concentrated sulfuric acid with a yellow coloration.

It will be understood that our invention is not limited to the precise details of procedure above set forth. Thus, although in many of the above examples we preferred to combine the preparation of the alkali-selenide with the step of selenation of the halogen-amino-anthraquinone body, producing the former in "nascent" state, so to speak, such combination is not essential to the success of the reaction. Previously prepared alkali-selenide, in solid form or in solution may be introduced into the alcoholic suspension of the halogen-amino-anthraquinone body. Similarly, the production of said "nascent" sodium selenide is not limited to the use of either a sodium-alcohol or an aluminum-caustic soda combination. Any other reducing agent, or mixture, which does not require the use of acid, may be used. In general, it is to be understood that our invention is not limited, except as defined by the following claims.

We claim:

1. An intermediate for dyestuffs comprising an anthraquinone compound substituted by a selenium containing radical in an alpha position and by an amino group in a position ortho thereto.

2. An anthraquinone compound containing a selenium containing radical in an alpha position, and an amino group in a position ortho thereto.

3. An anthraquinone compound possessing the general formula:

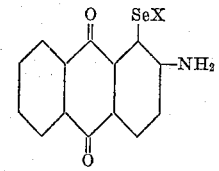

wherein X stands for hydrogen, a metallic atom or radical, or the radical:

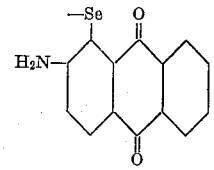

4. A compound of the group consisting of 2-amino-anthraquinone-1-selenol and its alkali-metal salts.

5. A compound of the group consisting of 3-halogen-2-amino-anthraquinone-1-selenol and its metallic salts.

6. As a new product, a 2,2'-diamino-dianthraquinonyl-diselenide.

7. As a new product, 2,2'-diamino-1,1'-dianthraquinonyl-diselenide.

8. A process for preparing an intermediate for dyestuffs, which comprises replacing by selenium the alpha-halogen atom in a 1-halogen-2-amino-anthraquinone compound.

9. A process of preparing intermediates for dyestuffs which comprises reacting upon a 1-halogen-2-amino-anthraquinone compound with an inorganic selenide.

10. A process of preparing intermediates for dyestuffs which comprises reacting upon a 1-halogen-2-amino-anthraquinone compound with an alkali-metal selenide.

11. A process of preparing intermediates for dyestuffs which comprises reacting upon a 1-halogen-2-amino-anthraquinone compound with an alkali-metal selenide in an alcoholic medium.

12. A process of preparing intermediates for dyestuffs which comprises reacting upon a 1-halogen -2- amino-anthraquinone compound with nascent alkali-metal selenide in an organic suspending medium.

13. A process of preparing intermediates for dyestuffs which comprises reacting upon a 1-halogen-2-amino-anthraquinone compound with selenium and an alkaline reducing agent in alcoholic suspension.

14. A process of preparing intermediates for dyestuffs which comprises reacting upon a 1-halogen-2-amino-anthraquinone compound with an alkali-metal selenide and oxidizing the reaction product to produce the corresponding 2,2'-diamino-1,1'-dianthraquinonyl-diselenide.

15. A process of preparing intermediates for dyestuffs which comprises reacting upon a 1-halogen-2-amino-anthraquinone compound with an alkali-metal selenide and aerating the reaction product to produce the corresponding 2,2'-diamino-1,1'-dianthraquinonyl-diselenide.

16. A compound of the group consisting of 2-amino-anthraquinone-1-selenol, its halogen substitution derivatives, metallic salts of these selenols and mild oxidation derivatives of such selenols.

17. An anthraquinone compound possessing the general formula:

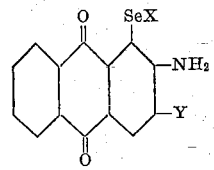

wherein Y stands for hydrogen or halogen, and wherein X stands for hydrogen, a metallic atom or radical, or the radical

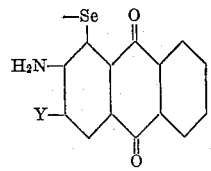

Y having the same significance as above.

MELVIN A. PERKINS.
EVA P. BISHOP, and
WILMINGTON TRUST CO.,
By ELWYN EVANS,
Vice President,
Executors of the Estate of Oakley Maurice Bishop, Deceased.